United States Patent [19]

Chino et al.

[11] 4,053,650
[45] Oct. 11, 1977

[54] BAKED CONFECTIONS AND PROCESS FOR THE PREPARATION THEREOF

[75] Inventors: Jiro Chino; Kazuhiko Nakada, both of Yokohama, Japan

[73] Assignee: Meji Seika Kaisha Ltd., Tokyo, Japan

[21] Appl. No.: 681,042

[22] Filed: Apr. 28, 1976

Related U.S. Application Data

[63] Continuation-in-part of Ser. No. 523,494, Nov. 13, 1974, abandoned.

[30] Foreign Application Priority Data

Nov. 13, 1973  Japan .................................. 48-126806

[51] Int. Cl.$^2$ ....................... A21D 2/00; A21D 10/00; A21D 8/00
[52] U.S. Cl. ..................................... 426/304; 426/305; 426/309; 426/446; 426/93; 426/94; 426/103
[58] Field of Search ................. 426/138, 279, 544, 93, 426/94, 89, 103, 293, 297, 303–307, 309, 512, 274, 275

[56] References Cited

U.S. PATENT DOCUMENTS

| | | | |
|---|---|---|---|
| 1,597,979 | 8/1926 | James et al. | 426/279 |
| 3,063,843 | 11/1962 | Hashimoto | 426/93 |
| 3,723,137 | 3/1973 | Fischer et al. | 426/293 |
| 3,787,588 | 1/1974 | Turitz | 426/94 |

*Primary Examiner*—Jeanette M. Hunter
*Attorney, Agent, or Firm*—Oblon, Fisher, Spivak, McClelland & Maier

[57] ABSTRACT

Baked confections are prepared by coting edible particles, such as seeds or nuts or other particles of various foods, alternately with edible flour, such as cereal flours, or starches, and aqueous solutions such as a corn syrup, a sugar solution, a gum solution, or a dextrin solution in a coating device such as a revolving pan or drum until the size of the coated particles reach a predetermined size corresponding to the size of the inner cavity of a baking mold, subsequently baking such coated particles in a baking mold consisting of upper and lower matching units and having a desired shape, with or without engravings on its inner surface. The baked confections can be prepared in any shape in which the edible particle is in a movable state within the open space of the shell layer.

3 Claims, 11 Drawing Figures

BAKED CONFECTIONS AND PROCESS FOR THE PREPARATION THEREOF

CROSS-REFERENCE TO RELATED APPLICATIONS

This application is a Continuation-In-Part application of application Ser. No. 523,494, filed Nov. 13, 1974, now abandoned.

BACKGROUND OF THE INVENTION

Field of the Invention

This invention relates generally to baked confections having a given shape and size and having incorporated therein one or more edible particles and being of a crisp texture when eaten and to an improved process for the preparation thereof.

The preparation of such baked confections, generally known as pulseconfections, or those made by coating leguminous seeds, such as peanuts, green peas or the like, with a syrup in combination with rice flour, wheat flour, starches or a mixture thereof and subsequently roasting or frying the coated particles, is well known. The so-called "ONOR OKEMAME", a Japanese conventional pulse snack, is a typical example of such baked pulse confections.

In the above process for the preparation of pulse confections, leguminous seeds or the like are coated several times with a syrup and cereal flour and/or starches, one after another, in a coating device, such as a revolving pan. Subsequently, the coated leguminous seeds are either directly roasted with a burner attached to the coating device, or they are roasted in a basket drum roaster with a burner or fried after being taken from the coating device and are dried separately. In either case, puffing is done naturally, and therefore it is impossible to satisfactorily control the outside shape of the final products during the puffing. Consequently, the post-puffing condition and the degree of rupture and cracking of the coating layer lack uniformity, and it is thus quite difficult and requires the long experience of a skilled person to properly attain the desired coating layer having a texture and hardness matched with those of the seeds or nuts which serve as the centers of the final baked confectionary products.

It is known in the art to enclose such an edible item in a dough product and bake the same. Turitz (U.S. Pat. No. 3,787,588) describes such a method. However, it is difficult and troublesome to wrap small edible items with such a thin dough shell, and at the same time it is not easy to wrap these items without leaving such strain and unevenness in thickness as to cause uneven expansion when fried or baked.

Baking in a closed mold consisting of upper and lower matching units is also known in the art. To bake wafers, or corn cups, such a closed mold is used. However, batter with low viscosity and with moisture of about 58 to 65% is used to spread and reach all the corners of the mold.

Such dough as mixed and kneaded in the mixer cannot be successfully baked in this closed mold so as to obtain a uniformly expanded final product.

SUMMARY OF THE INVENTION

Accordingly, it is an object of the present invention to provide puffed confections of high quality in which leguminous seeds, nuts or other food particles are incorporated, which, unlike those produced by prior art precesses do not require such experience by skilled persons in the preparation and which show the desired degree of puffing and therefore have the desired hardness and texture.

Further, it is another object of the present invention to enclose the aforementioned food particles within a uniformly expanded structure without moisture pick-up which ordinarily renders these food particles soft, flabby and not crisp.

In this invention, as small edible particles, besides those pulses used in conventional pulse confections such as pea nuts, soy beans, green peas, and the like, tree nuts, such as the almond, and dried fruits, such as pineapple, apple, and the like, as well as dried berries, such as raisins, processed or candied products, and baked products, such as biscuits, are also used. These small particles of various foods are coated in a coating device, such as a revolving pan, alternately with edible flour compositions of such cereal flour as wheat flour, rice flour or the like, such starches as $\alpha$-waxy maize starch, or corn starch and aqueous solutions comprising a corn syrup, a sugar solution, a gum solution, a dextrin solution or a mixture thereof. The operation is repeated several times in order to obtain coated particles having a given particle size. In addition to the above coating compositions for preparing these coated particles, when edible flour compositions comprised of more than about 40% of such self-non-expandable cereal flour as wheat flour, rice flour or the like, or such starches as corn starch, potato starch or the like, and less than about 60% of such self-expandable cereal flours or starches comprising $\alpha$-waxy rice flour, or $\alpha$-waxy maize starch, an appropriate amount of a leavening agent such as sodium carbonate, or ammonium carbonate is necessary to be added preferably to aqueous solutions.

When the edible flour compositions comprise about 60% and over of such self-expandable cereal flours or starches as $\alpha$-waxy rice flour, or $\alpha$-waxy maize starch, and about 40% and below of the aforementioned self-nonexapndable cereal flours or starches, it is optional to add a leavening agent.

In the above described method of providing "a given particle size" of such coated particles, a particle size should be provided corresponding to the dimension and shape of the hereinafter described baking mold, which is in general about 60 to 90%, preferably 70 to 80%, as large as the inner size of the mold, although such depends upon the composition and quantity of the edible flour or aqueous solution applied.

When the particle size of the coated particle is more than 90% as large as the inner size of the mold, steamed and gelatinized paste of the coated layer is forced out of the mold through the small setting gap of the matching units of the mold and baked products with extra projections are obtained by baking in the closed mold.

On the other hand, when the particle size is less than 60% as large as the inner size of the mold, because of a decrease in the expansion pressure of the coated layer, the coated particle does not expand to such an extent that the coated dough composition spreads and reaches all the corners of the mold, and consequently, a baked product with an expected shape and engravings, if engraved, cannot be obtained.

As described hereinabove, then, a suitable range of the particle size is generally about 60 to 90%, and preferably 70 to 80%, depending on the composition and quantity of the edible flours applied. As the proportion of such self-expandable flour or starches, such as α-waxy rice flour or α-waxy maize starch increases, the particle size gets nearer 60%, preferably 70% and as the porportion decreases, the particle size gets nearer 90%, preferably 80%. The size of the center materials can be made uniform within a certain range smaller than the size noted hereinabove. Thus, by appropriately selecting the size of the coated particles, or in other words, by selecting the thickness of the coated layer in correspondence with the hardness and texture of the center materials, from within the above range, the degree of puffing of the coated particles can be controlled and final products having eating characteristics matched with the hardness and texture of the centers are obtainable.

The degree of puffing of the coated particles is also affected by the amount of moisture of the coated layers.

A suitable moisture content of the coated layer is present in an amount of about 15 to 22%, preferably about 18 to 21% by weight of the coated layer, which enables the coated layer to puff to such a degree that the final products have clean beautiful shapes and engravings, if engraved, corresponding to the inner surface of the baking mold.

If the moisture content of the coated layer is more than 23%, when the articles are baked, there occurs as a result of the excess pressure of the steam vapor and the expanding strength of the edible flour compositions, the phenomenon that steamed and gelatinized paste compositions of the coated layer are forced out of the mold through the small setting gap of the matching units of the mold, and consequently, baked products with extra projections are obtained.

During and after alternate coating with aqueous solutions and flour compositions, the coated pieces are liable to change their shape and stick together. This naturally results in an uneven expansion when baked.

Furthermore, if the moisture content of the coated layer is less than 14%, when the articles are baked there occurs as a result of the decreased pressure of the steam vapor and the degree of gelatinization of the edible flour composition, the phenomenon that the coated layer does not sufficiently expand so that the cavity of the mold cannot be filled with the expanding materials.

Baking molds employed in the present invention consist of upper and lower partners of matching units, which are made to imitate the shape of a baseball, a gourd, a shelled peanut or walnut, a marron, a peach, a kidney-bean, a green soybean, an almond or the like, and which may or may not have the corresponding engravings of such on their inner surfaces. Thus, according to one specific example of the present invention, one coated particle is filled into each of the hollows of a baking mold having an interiorly corrugated section in its center of longitudinal direction, and after the upper and lower parts of the mold are joined together, the coated particles are baked therein. A baked confection having an exteriorly corrugated shape, for example, like that of a pea pod or shell, may be obtained. The baking of such is conducted at a temperature of about 150° to 250° C.

By the expanding action of the materials which are incorporated in the coated layer of the coated particles, a well as by the aid of a leavening agent, if incorporated, the coating layer is caused to puff so that the cavity of the mold is filled with the expanding materials. When two or more coated particles are charged in accordance with the length of the baking mold, they adhere to each other and are integrated into a baked confection having various shapes as desired. The resulting baked product has a water content of 2 to 6%, preferably 2 to 4%, and has storage stability over a long period of time, if being properly packaged.

The following describes typical shapes of the baked confections which may be prepared by the process of the present invention, however, it must be noted that the various changes in the shape and size of the confections may be made without departing from the spirit of the present invention. According to the invention, there is formed an open space area surrounded by a shell layer, and an edible particle is disposed in a movable state in the open space area. This space is formed due to expansion of the coating materials when the edible coated particle is baked. Further, the confections of the present invention have no joints on the shell or coating layer which appear on a confection of such type which is prepared merely by jointing together the previously shaped shell partners within which the particle as a center is first incorporated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference numerals designate like or corresponding parts of the different figures and wherein.

DETAILED DESCRIPTION OF THE INVENTION

Figure 3:
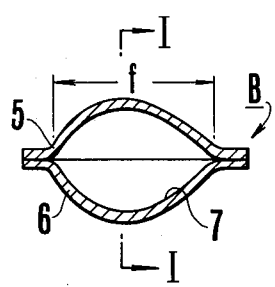
FIG. 3 is a vertical sectional view of the baking mold utilized in Example 2 for attaining the confection shown in FIG. 2.

Referring now to the drawings, the present invention will now be described by way of particular examples, being enumerated below as Examples 1, 2, 3, 4 and 5.

EXAMPLE 1

Figure 1:
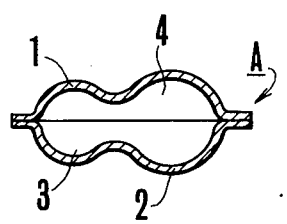
FIG. 1 is a vertical sectional view of a baking mold used in Example 1 to be hereinafter described.

This example is concerned with the preparation of a gourd-shaped baked confection with peanuts as centers, using a baking mold A, as shown in FIG. 1. This baking mold A consists of an upper mold 1 and a lower mold 2, the upper and lower molds 1 and 2 forming, when joined together, a gourd-shaped, closed cavity consisting of a smaller spherical portion 3 and a larger spherical portion 4. The smaller spherical portion 3 is preferably so formed as to have a diameter of about 15mm; while the larger spherical portion has a diameter of about 20mm.

400 parts of crude peanuts roasted previously at 160° C for 15 minutes are placed in a revolving pan, where they are coated, using 500 parts of a gum solution and 500 parts of α-waxy rice flour, alternately. This coating operation is continued until the coated particles to be charged into the smaller spherical portion 3 of the baking mold A have a particle size of about 11 to 12mm and the coated particles to be charged into the larger spherical portion 4 have a particle size of about 15 to 17mm. The two coated particles with peanuts as centers thereof having the respective desired sizes indicated are then charged, one by one, into the smaller and larger spherical portions 3 and 4, respectively, of the baking mold A, which is preheated to 170° C. The upper mold 1 and lower mold 2 are joined together and baking is conducted by heating both sides at 170° C for 2 minutes. A beautiful gourd-shaped, baked confection with two peanuts as centers is thus obtained. The gum solution used in this example is prepared by adding water to a mixture of 70 parts by weight of sugar, 25 parts by weight of corn syrup and 5 parts by weight of gum arabic, heating until dissolved, adjusting the concentration of BX 68.

EXAMPLE 2

Figure 2:
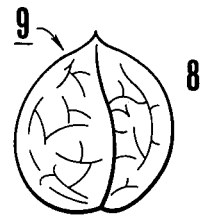
FIG. 2 is an oblique plan view of a confection obtained through Example 2, also to be described in detail hereinafter.

This example is concerned with the preparation of a walnut-shaped confection with a hazelnut as the center and having a shape as shown in FIG. 2.

500 parts of hazelnuts are first roasted and then placed in a revolving pan and are coated, using alternately, 500 parts of a dextrin solution and 500 parts of a mixture of α-waxy rice flour and maize starch (50 : 50). The coating operation is continued until the particle size reaches 15 to 17mm in the shortest diameter and 18 to 20mm in the longest diameter.

One coated particle with a hazelnut as the center having the desired size is charged into a baking mold B preheated to 175° C.

Figure 4:
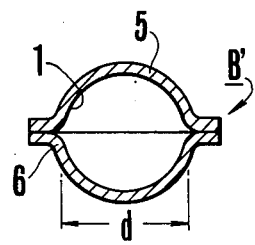
FIG. 4 is a sectional view of FIG. 3 taken along the line I—I thereof.

As shown in FIGS. 3 and 4, this baking mold B is so formed that the inner surfaces 7 form a gourd-like shape when the upper and lower molds 5 and 6 are joined together and is provided with engravings on its inner surfaces, not shown, which give the appearance of a walnut. The longest inner diameter "$f$" is preferably about 28mm and the diameter in the central portion "$d$" is about 20mm. The upper and lower molds 5 and 6, are so constructed as to be easily joined together or separated.

When the coated particle is placed into the baking mold B and is baked by heating both sides of the baking mold B at 175° C for 2 minutes, a hazlenut incorporated baked confection 9 having a walnut-like outside shape and engravings 8 is obtained. The aqueous dextrin solution used in this example was prepared by adding water to a mixture of 60 parts by weight of dextrin and 40 parts by weight of sugar, heating until dissolved and adjusting the concentration of BX 55 and dissolving therein 1 part of sodium bicarbonate and 1 part of ammonium carbonate.

EXAMPLE 3

This example is concerned with the preparation of a pea shell-shaped baked confection.

Figure 5:
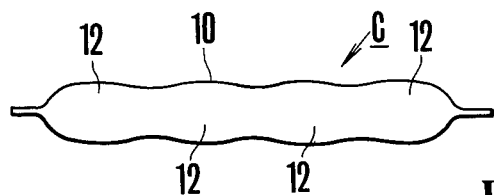
FIG. 5 is a plan view of a baking mold used in Example 3, also to be decribed in detail hereinafter.
Figure 6:
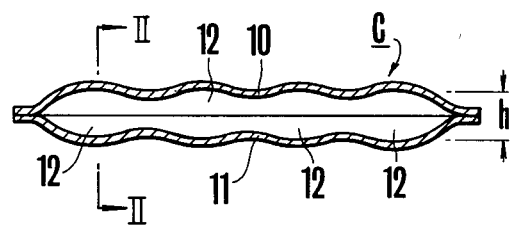
FIG. 6 is a vertical sectional view of the baking mold used in Example 3.
Figure 7:
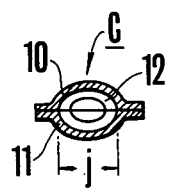
FIG. 7 is a sectional view of FIG. 6 taken along the line II—II thereof.

400 parts of roasted green peas are placed in a revolving pan, as in Example 1, and coated using 500 parts of a mixture of a gum solution (prepared as in Example 1), ammonium carbonate, and sodiumbicarbonate (100 : 1 : 1 in weight) and 500 parts of wheat flour alternately until the particle size reaches about 9 to 12mm. Four such coated particles are charged into a baking mold C, as shown in FIGS. 5 through 7.

This baking mold C consists of an upper mold 10 and a lower mold 11 and is so formed that the cavity formed when the upper and lower molds are joined together to take the form of a pea shell is provided with four protuberances 12, in imitation of shelled peas. The length of this baking mold C is preferably about 70mm, the height "$h$" of the respective protuberances 12 is equally about 1mm and the width "$j$" is about 15mm. One coated particle prepared as above is charged into each protuberance 12 of the baking mold C in such a manner that the coated particles might not be spaced too closely to one another, and is baked as in Example 1. The product is a pea shell-shaped baked confection with greenpeas as the centers.

Although, in this example, four coated particles ar charged, it is also possible to vary the number of protuberances 12 of the baking mold C and to charge the corresponding number of coated particles into the hollows thereof.

EXAMPLE 4

This example is concerned with the preparation of a dried, peachshaped, baked confection with a dried fruit as its center.

Figure 8:
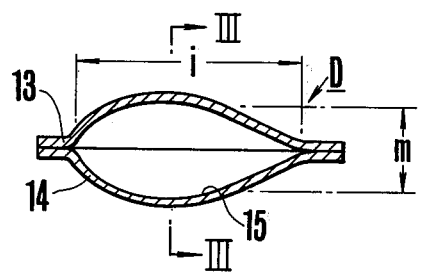
FIG. 8 is a vertical sectional view of a baking mold used in Example 4 to be described in detail hereinbelow.
Figure 9:
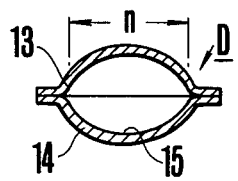
FIG. 9 is a sectional view of FIG. 8 taken along the line III—III thereof.

Dried pineapples, for example, are cut into pieces having a length of about 20mm, a width of about 15mm and a height of about 6mm and subjected to a coating operation in a revolving pan, as in Example 1, in such a manner that the pieces do not stick together in the pan, until the thickness of the coating layer reaches about 2mm to 2.5mm. The thus coated particles take the form of a flat ellipsoid of revolution. The particle is charged into a baking mold D, as shown in FIGS. 8 and 9, and is baked in the same manner as in Example 1. The product is a peach-shaped, baked confection with a dried pineapple as its center.

The baking mold D consists of an upper mold 13 and a lower mold 14 and is so formed that the cavity formed when the upper and lower molds 13 and 14 are joined together takes the form of a peach. The inner surface 15 is provided with the engravings of a peach, not shown, and the length "$l$", the height "$m$" and the width "$n$" of the mold are preferably about 30mm, 23mm and 23mm, respectively.

EXAMPLE 5

100 parts of peanuts, free from their skin, are coated with 6 parts of melted vegetable shortening by using a revolving pan.

The resulting coated particles are further coated with 100 parts of dextrin solution (prepared as in Example 2) and edible flour mixture composed of 45 parts by weight of α-waxy rice flour, 35 parts by weight of α-waxy corn starch, 10 parts by weight of wheat flour and 10 parts by weight of sugar, alternately, and are baked as described in Example 1.

An open space is formed between the peanuts as the center and the shell, the peanuts being in a movable state in the open space area.

The final products, when shaken, give rise to a pleasant sound as the peanuts roll about in the open space area.

Figure 10:
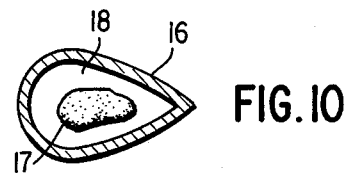
FIGS. 10 and 11 are sectional views of typical embodiments of the confections obtained according to the process of the present invention, as set forth in Example 5, as described in detail hereinbelow.
Figure 11:
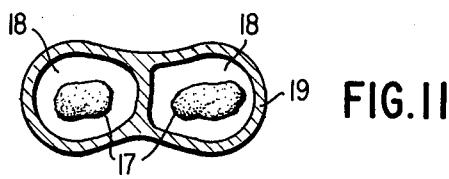

FIGS. 10 and 11 show cross-sectional views of the embodiments of the confections prepared according to Example 5, wherein reference numerals 16 and 17 denote a shell layer and the edible particles, respectively, and reference numberal 18 denotes the open space area.

Obviously, numerous modifications and variations of the present invention are possible in light of the foregoing. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A process for the preparation of mold-baked confections, comprising the steps of:

coating edible particles alternately with an aqueous viscous solution selected from the group consisting of a corn syrup, a sugar solution, a gum solution and a dextrin solution and mixtures thereof, and a leavening agent selected from the group consisting of ammonium carbonate and sodiumbicarbonate, and with an edible flour composition comprising more than 40% of self-nonexpandable cereal flour or starches selected from the group consisting of wheat flour, rice flour, maize starch and potato starch and less than 60% of selfexpandable cereal flours or starches selected from the group consisting of α-waxy rice flour and α-waxy maize starch, in a rotating coating device, said coating operation being repeated until the coated particles reach about 60 to 90% of the size of the inner cavity of a baking mold, the moisture of the coated layer of said coated particles being in an amount of about 15 to 22% by weight of the coated layer;

placing said coated particles in the baking mold consisting of upper and lower matching units and having a cavity of a desired shape; and after joining together said upper and lower parts of said baking mold, baking said coated particles in said mold at a temperature in the range of from 150° C to 200° C for a period of time sufficient to cause the coated compositions of said coated particles to expand so that the cavity of said baking mold is filled with the expanding materials.

2. A process as claimed in Claim 7 wherein:

said aqueous solutions comprise ingredients selected from the group consisting of a corn syrup, a sugar syrup, a gum solution, a dextrin solution and mixtures thereof and said edible flour compositions comprise 60% and over of self-expandable cereal flours or starches selected from the group consisting of α-waxyrice flour, α-waxy maize starch and mixtures thereof, and 40% and below of self-nonexpandable cereal flours or starches selected from the group consisting of wheat flour, rice flour, maize starch and mixtures thereof, the incorporation of said leavening agent within said aqueous solution being obviated.

3. A process as claimed in Claim 1, wherein said edible particles are coated with an edible fatty composition previous to said alternate coating with aqueous compositions and edible flour compositions.

* * * * *